(12) United States Patent
Puri et al.

(10) Patent No.: US 12,373,277 B2
(45) Date of Patent: Jul. 29, 2025

(54) SYSTEM AND METHOD FOR DETERMINING CAUSES OF NETWORK ANOMALIES ACROSS A DISTRIBUTED NETWORK

(71) Applicant: BANK OF AMERICA CORPORATION, Charlotte, NC (US)

(72) Inventors: Anmol Puri, Haryana (IN); Nusrath Fathima, Telangana (IN); Srikanth Gonda, Telangana (IN); Lingaraj Gopalakrishnan, Chennai (IN); John Bilton Kommu, Telangana (IN); Ashok Kumar, Chandanagar (IN); Avinash Basavant Nigudkar, Mumbai (IN); Shalu Wadhwa, N.I.T. Faridabad (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 75 days.

(21) Appl. No.: 18/229,481

(22) Filed: Aug. 2, 2023

(65) Prior Publication Data
US 2025/0045144 A1 Feb. 6, 2025

(51) Int. Cl.
*G06F 11/07* (2006.01)
*G06F 11/34* (2006.01)

(52) U.S. Cl.
CPC ........ *G06F 11/079* (2013.01); *G06F 11/0709* (2013.01); *G06F 11/0766* (2013.01); *G06F 11/0793* (2013.01); *G06F 11/3409* (2013.01)

(58) Field of Classification Search
CPC .............. G06F 11/079; G06F 11/0709; G06F 11/0766; G06F 11/0793; G06F 11/3409
USPC .......................................................... 714/37
See application file for complete search history.

(56) References Cited

U.S. PATENT DOCUMENTS

| 2004/0090341 A1* | 5/2004 | Hendrickson ....... G06F 11/2247 714/E11.146 |
| 2019/0182101 A1* | 6/2019 | Kulshreshtha ...... H04L 41/0631 |

* cited by examiner

*Primary Examiner* — Yair Leibovich
(74) *Attorney, Agent, or Firm* — Moore & Van Allen PLLC; Nicholas C. Russell

(57) ABSTRACT

Systems, computer program products, and methods are described herein for determining causes of network anomalies across a distributed network. The method includes determining one or more known indicator patterns from one or more error logs for one or more applications on a network. The method also includes receiving one or more performance indicators during an execution of an application. The method further includes comparing the one or more performance indicators to one or more known indicator patterns. The method also includes determining at least one of the one or more performance indicators that is malfeasant. The method also includes determining a malfeasant component of the network based on the one or more performance indicators that is malfeasant. The method also includes determining a remediation action to be executed in response to the comparison of the one or more performance indicators to one or more known indicator patterns.

20 Claims, 6 Drawing Sheets

SYSTEM AND METHOD FOR DETERMINING CAUSES OF NETWORK ANOMALIES ACROSS A DISTRIBUTED NETWORK

TECHNOLOGICAL FIELD

Example embodiments of the present disclosure relate generally to network security and, more particularly, to determining causes of network anomalies across a distributed network.

BACKGROUND

Networks rely on distributed computing environments to execute applications quickly and effectively. However, distributed computing environments create more points of potential failure for the application execution. Applicant has identified a number of deficiencies and problems associated with timely detection of potentially unauthorized access, system errors, or data loss events. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for determining causes of network anomalies across a distributed network is provided. The system includes at least one non-transitory storage device containing instructions and at least one processing device coupled to the at least one non-transitory storage device. The at least one processing device, upon execution of the instructions, is configured to determine one or more known indicator patterns from one or more error logs for one or more applications on a network. Each of the one or more known indicator patterns includes known performance indicators from one or more error logs. The at least one processing device, upon execution of the instructions, is also configured to receive one or more performance indicators during an execution of an application on the network. The at least one processing device, upon execution of the instructions, is further configured to compare the one or more performance indicators to one or more known indicator patterns. Each of the one or more known indicator patterns has an operating designation and the operating designation includes an indication of a malfeasant operating status or a regular operating status. The at least one processing device, upon execution of the instructions, is still further configured to determine at least one of the one or more performance indicators that is malfeasant based on the comparison of the one or more performance indicators to one or more known indicator patterns. The at least one processing device, upon execution of the instructions, is also configured to determine a malfeasant component of the network based on the one or more performance indicators that is malfeasant. The malfeasant component of the network is associated with one of the at least one of the one or more performance indicators that is malfeasant. The at least one processing device, upon execution of the instructions, is also configured to determine a remediation action to be executed in response to the comparison of the one or more performance indicators to one or more known indicator patterns. The remediation action is based on the malfeasant component of the application.

In various embodiments, the at least one processing device, upon execution of the instructions, is configured to identify one or more performance indicators to monitor during the operations of the application on the network. In various embodiments, the at least one processing device, upon execution of the instructions, is configured to cause an execution of the remediation action.

In various embodiments, the at least one processing device, upon execution of the instructions, is configured to cause a rendering of the remediation action on a graphical user interface of an end-point device associated with the application. In various embodiments, the at least one processing device, upon execution of the instructions, is configured to receive an action input from the end-point device in response to the rendering of the remediation action on a graphical user interface. In various embodiments, the at least one processing device, upon execution of the instructions, is configured to update the remediation action based on the action input.

In various embodiments, the at least one processing device, upon execution of the instructions, is configured to receive one or more updated performance indicators after an execution of the remediation action and determine a result of the remediation action based on the one or more updated performance indicators.

In another example embodiment, a computer program product for determining causes of network anomalies across a distributed network is provided. The computer program product includes at least one non-transitory computer-readable medium having computer-readable program code portions embodied therein. The computer-readable program code portions include one or more executable portions configured to determine one or more known indicator patterns from one or more error logs for one or more applications on a network. Each of the one or more known indicator patterns includes known performance indicators from one or more error logs. The computer-readable program code portions include one or more executable portions also configured to receive one or more performance indicators during an execution of an application on the network. The computer-readable program code portions include one or more executable portions further configured to compare the one or more performance indicators to one or more known indicator patterns. Each of the one or more known indicator patterns has an operating designation and the operating designation includes an indication of a malfeasant operating status or a regular operating status. The computer-readable program code portions include one or more executable portions still further configured to determine at least one of the one or more performance indicators that is malfeasant based on the comparison of the one or more performance indicators to one or more known indicator patterns. The computer-readable program code portions include one or more executable portions also configured to determine a malfeasant component of the network based on the one or more performance indicators that is malfeasant. The malfeasant component of the network is associated with one of the at least one of the one or more performance indicators that is malfeasant. The computer-readable program code portions include one or more executable portions further configured to determine a remediation action to be executed in response to the comparison of the one or more performance indicators to one or more known indicator patterns. The remediation action is based on the malfeasant component of the application.

In various embodiments, the computer-readable program code portions include one or more executable portions are also configured to identify one or more performance indicators to monitor during the operations of the application on the network. In various embodiments, the computer-readable program code portions include one or more executable portions are also configured to cause an execution of the remediation action.

In various embodiments, the computer-readable program code portions include one or more executable portions are also configured to cause a rendering of the remediation action on a graphical user interface of an end-point device associated with the application. In various embodiments, the computer-readable program code portions include one or more executable portions are also configured to receive an action input from the end-point device in response to the rendering of the remediation action on a graphical user interface. In various embodiments, the computer-readable program code portions include one or more executable portions are also configured to update the remediation action based on the action input.

In various embodiments, the computer-readable program code portions include one or more executable portions are also configured to receive one or more updated performance indicators after an execution of the remediation action and determine a result of the remediation action based on the one or more updated performance indicators.

In still another example embodiment, a method for determining causes of network anomalies across a distributed network is provided. The method includes determining one or more known indicator patterns from one or more error logs for one or more applications on a network. Each of the one or more known indicator patterns includes known performance indicators from one or more error logs. The method also includes receiving one or more performance indicators during an execution of an application on the network. The method further includes comparing the one or more performance indicators to one or more known indicator patterns. Each of the one or more known indicator patterns has an operating designation and the operating designation comprises an indication of a malfeasant operating status or a regular operating status. The method still further includes determining at least one of the one or more performance indicators that is malfeasant based on the comparison of the one or more performance indicators to one or more known indicator patterns. The method also includes determining a malfeasant component of the network based on the one or more performance indicators that is malfeasant. The malfeasant component of the network is associated with one of the at least one of the one or more performance indicators that is malfeasant. The method also includes determining a remediation action to be executed in response to the comparison of the one or more performance indicators to one or more known indicator patterns. The remediation action is based on the malfeasant component of the application.

In various embodiments, the method includes identifying one or more performance indicators to monitor during the operations of the application on the network. In various embodiments, the method includes causing an execution of the remediation action.

In various embodiments, the method includes causing a rendering of the remediation action on a graphical user interface of an end-point device associated with the application and receiving an action input from the end-point device in response to the rendering of the remediation action on a graphical user interface. In various embodiments, the method includes updating the remediation action based on the action input.

In various embodiments, the method includes receiving one or more updated performance indicators after an execution of the remediation action and determining a result of the remediation action based on the one or more updated performance indicators.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
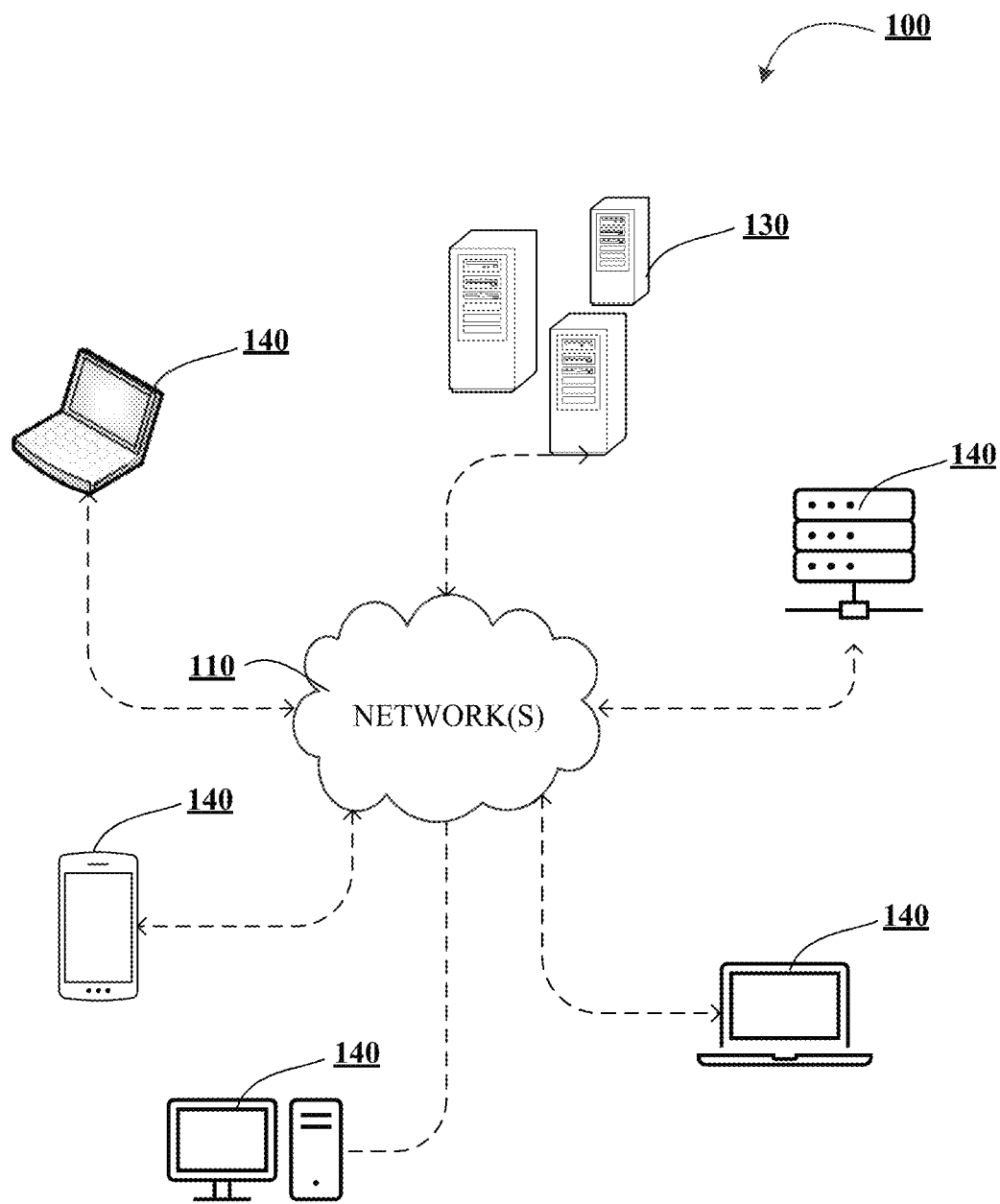
Figure 1B:
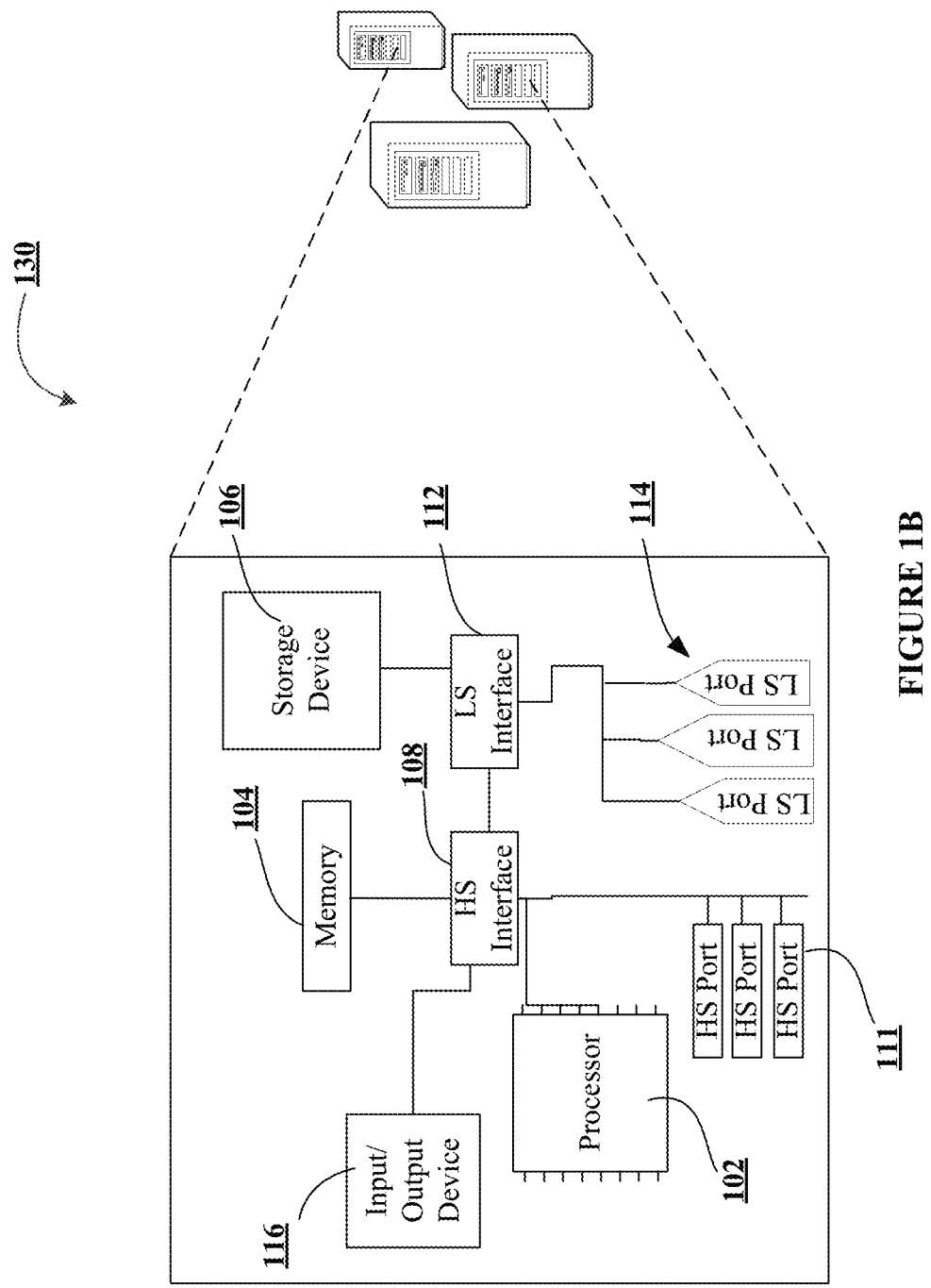
Figure 1C:
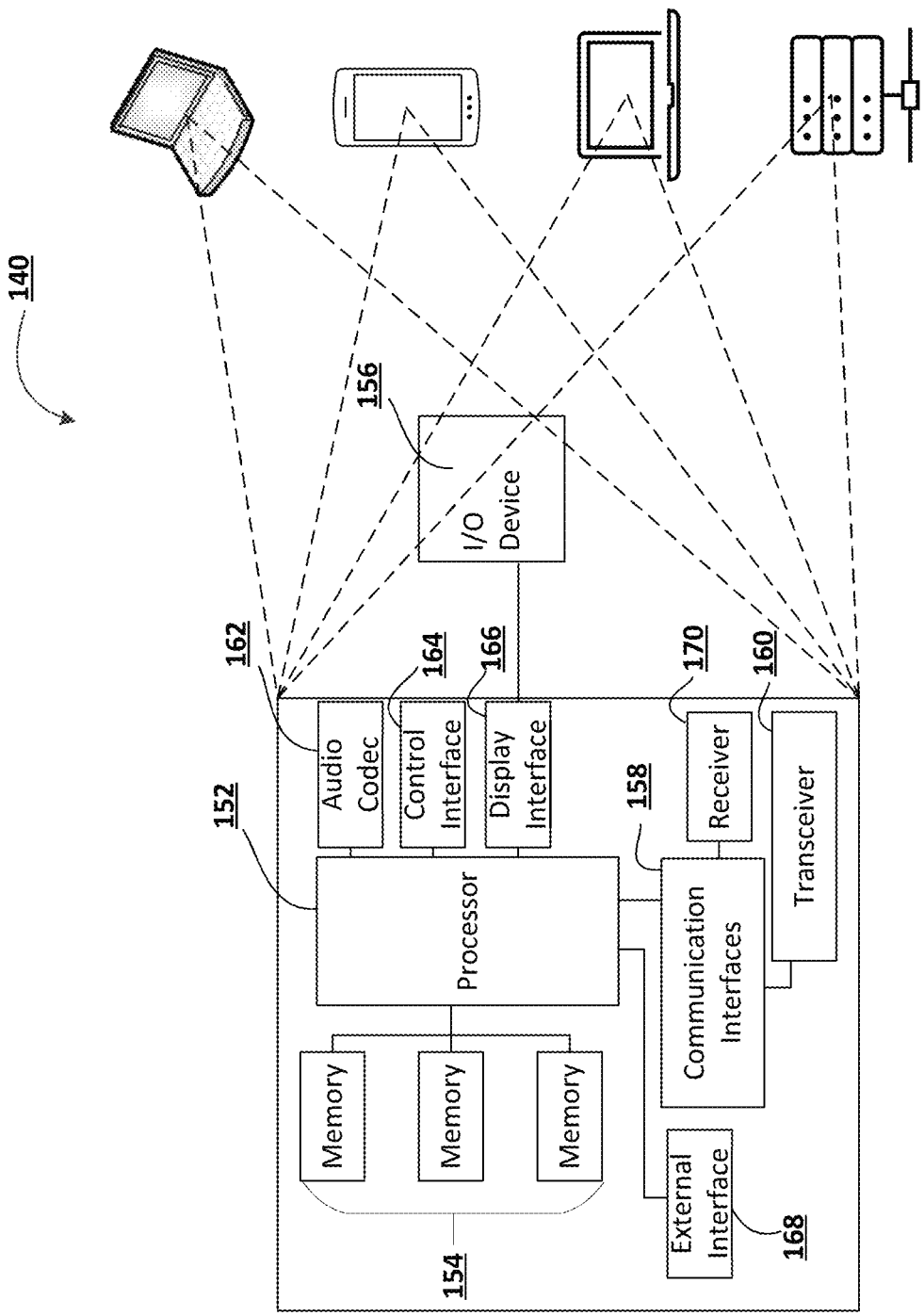
Figure 2:
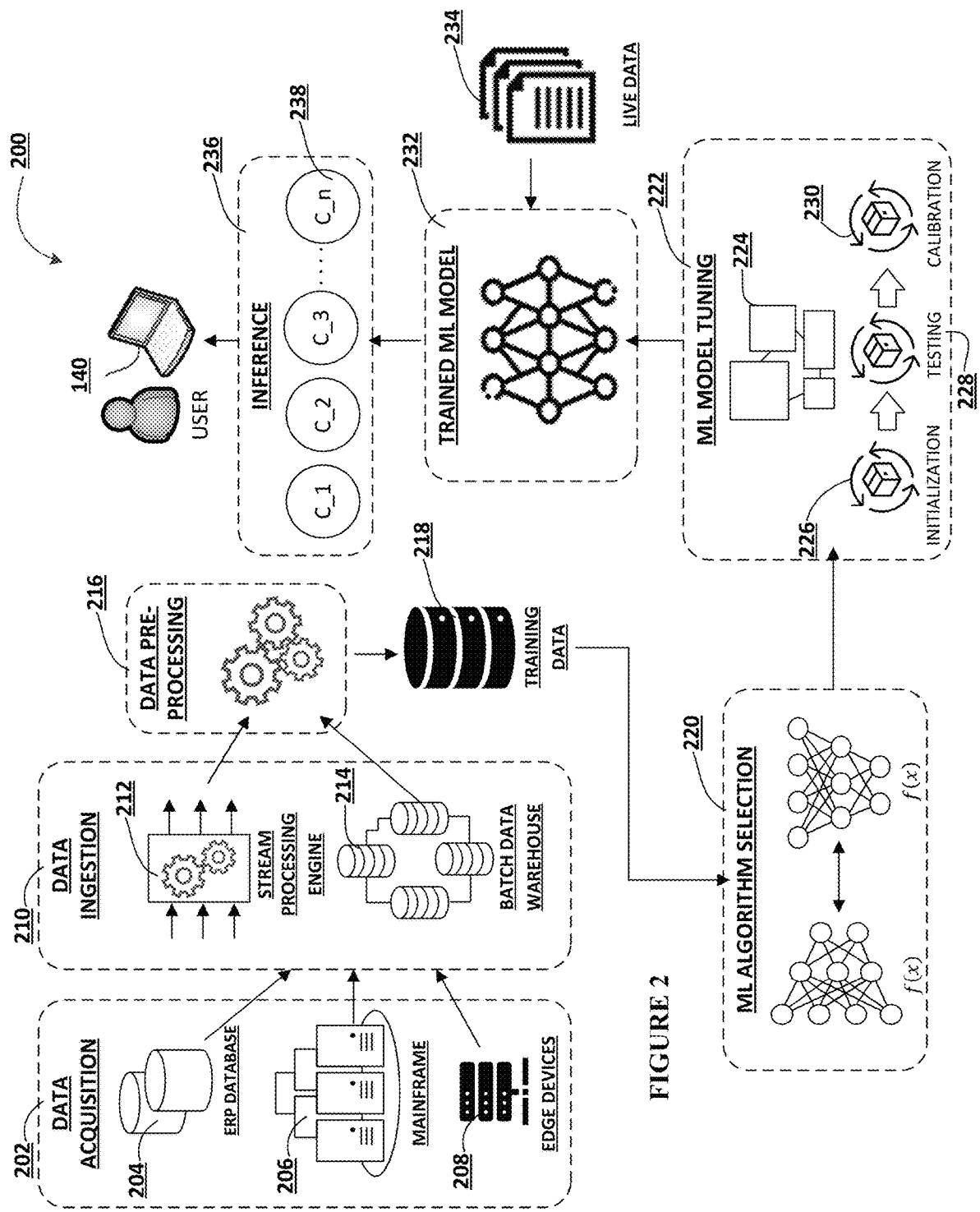
Figure 3A:
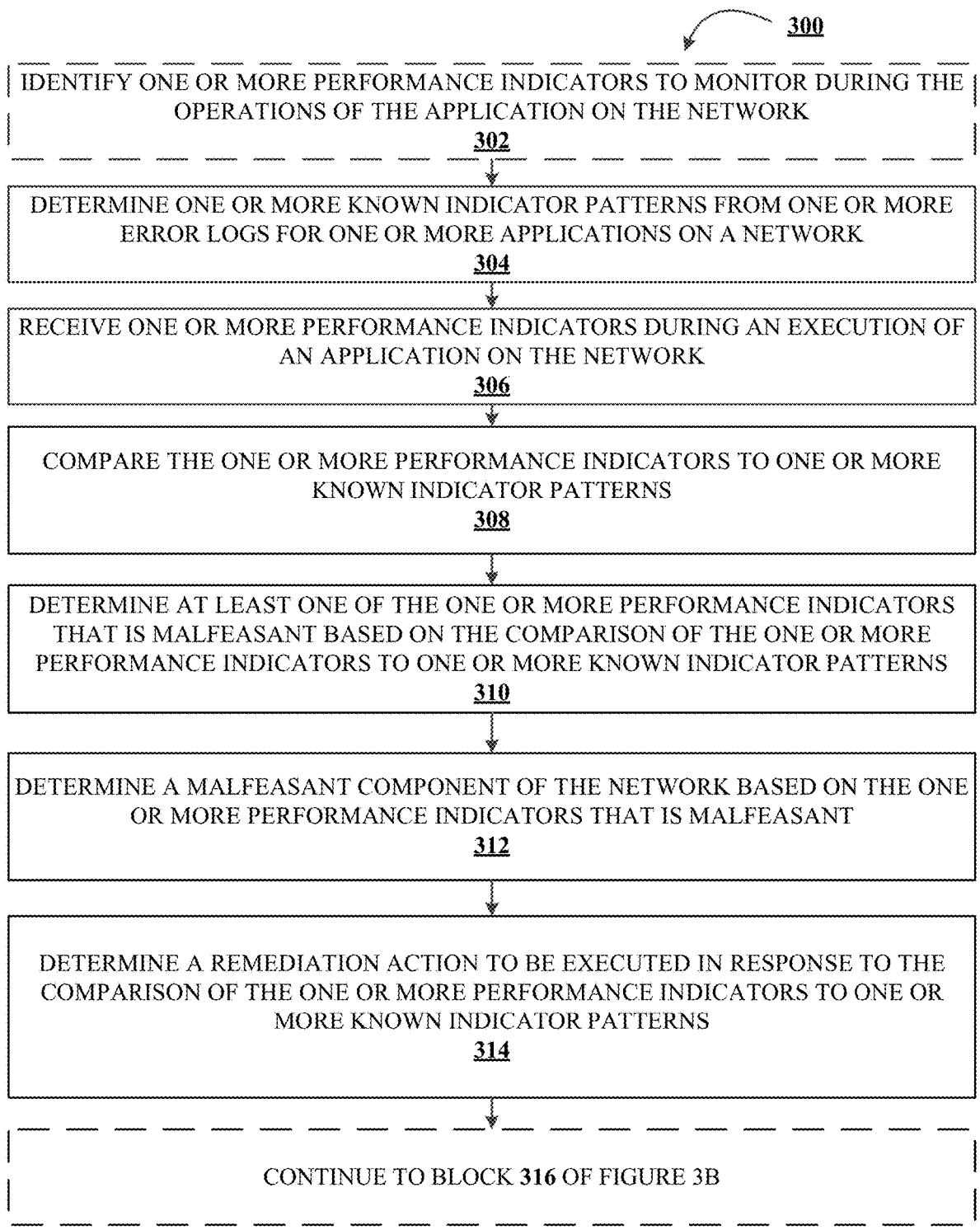
Figure 3B:
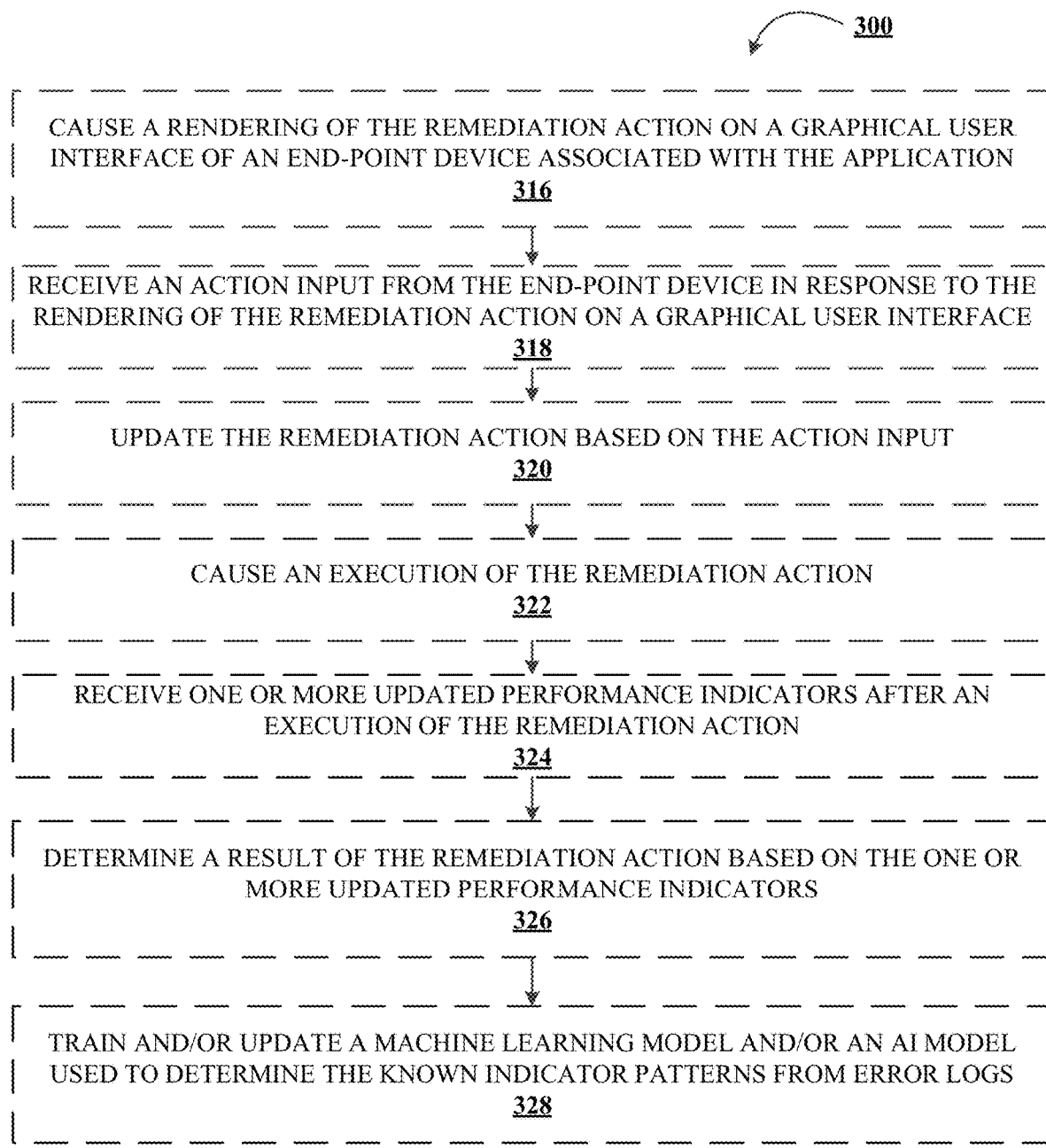

FIGS. 1A-1C illustrates technical components of an example distributed computing environment for determining causes of network anomalies across a distributed network, in accordance with various embodiments of the present disclosure;

FIG. 2 illustrates an example machine learning (ML) subsystem architecture 200 used in accordance with various embodiments of the present disclosure; and FIGS. 3A and 3B illustrate a process flow for determining causes of network anomalies across a distributed network, in accordance with various embodiments of the present disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data. An "entity" can encompass a wide range of organizations, such as institutions, groups, associations, financial institutions, establishments, companies, unions, authorities, and similar entities. The common factor among these entities is their utilization of information technology resources for processing substantial amounts of data. As such, an "entity" in this context denotes any organization or institution that employs information technology resources capable of processing large volumes of data, which can pertain to different aspects of the entity's operations.

As described herein, a "user" may be an individual associated with an entity. As such, in some embodiments, the user may be an individual having past relationships, current relationships or potential future relationships with an entity (e.g., a customer at a financial institution).

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device. Additionally, as used herein, a "resource" may also encompass computing or network resources. This broader definition of a resource includes elements such as computational power, storage capacity, network bandwidth, software applications, databases, virtual machines, servers, routers, switches, and other similar components associated with computing or network infrastructure.

As used herein, an "artificial intelligence" (AI) system is a computing framework designed to perform tasks that normally require human intelligence, such as understanding natural language, recognizing patterns, problem-solving, and making decisions. It is understood that these systems operate by mimicking the neural networks of humans in a simplified form. In some embodiments, they may consist of interconnected layers of nodes, often referred to as artificial neurons, that process information using dynamic state responses to external inputs. They are trained by feeding them large volumes of data and adjusting the connections between the nodes using complex mathematical algorithms based on the principles of statistics and calculus, allowing them to learn from this data. In some embodiments, an AI system may be stored and executed in various ways depending on the requirements of the specific implementation. It is understood that AI systems can be hosted on local machines, in data centers, or in the cloud. It is further understood that cloud-based AI systems are becoming increasingly common due to their scalability, cost-effectiveness, and the ability to handle vast amounts of data. AI systems may be employed for identifying data patterns and vulnerability vectors due to their ability to analyze large and complex datasets rapidly and accurately.

As used herein "machine learning" (ML), a subset of AI, may be utilized in some embodiments. ML algorithms learn from the data they process, enabling them to discover hidden insights and patterns that may not be apparent to human analysts. For instance, in cybersecurity, AI systems can analyze network traffic to identify patterns consistent with cyber threats or vulnerabilities, providing an effective tool for proactively safeguarding systems and data. It is understood that there are several types of ML algorithms, each suited to different types of tasks. These include supervised learning where the algorithm learns from labeled training data, and then applies what it has learned to new data. In further embodiments, unsupervised learning may employ unlabeled data and learn by identifying patterns and structures within it. Additionally, in some embodiments, reinforcement learning may involve an algorithm that learns by interacting with its environment and receives rewards or demerits based on its actions. Furthermore, semi-supervised learning may include a blend of supervised and unsupervised learning wherein various embodiments of the present disclosure employ the use of an algorithm which learns from a small amount of labeled data supplemented by a large amount of unlabeled data. Particularly regarding cybersecurity, ML may be used to identify patterns consistent with cyber vulnerabilities. The ML algorithm of various embodiments may analyze network traffic data, system logs, user behavior, or the like, and learn what "normal" activity looks like on an entity network infrastructure. Once the model has been trained on this data, it can then monitor network activity and identify anomalies or deviations from the normal pattern. These anomalies could potentially be cyber vulnerabilities, such as an intrusion, malicious activity, or use of a software vulnerability. This proactive approach to cybersecurity allows vulnerabilities to be detected and mitigated early, reducing the potential damage they may cause. In some embodiments, ML may provide valuable insights and automated decision-making capabilities across multiple entity communication channels.

Networks are becoming more and more distributed across different computing devices. As such, it can be difficult or impossible to quickly and effectively determine a cause of a network anomaly. Application operations are often distributed across multiple processors, multiple memory devices, multiple communication interfaces, etc., and the only a single component failing may cause application execution errors. Various embodiments of the present disclosure allow for more effective malfeasant component detection, in order to determine the cause of network anomalies.

Various embodiments of the present disclosure allow for determining causes of network anomalies across a distributed network. The system determines known indicator patterns from one or more errors logs associated with a network. The known indicator patterns include one or more known performance indicators (e.g., key performance indicators) that are associated with the application executions that are designated as either regular or malfeasant. The system may monitor a network for performance indicators for an application being executed. The performance indicators are compared to the known performance indicators to determine whether the application execution is malfeasant or regular. In an instance in which the application execution is malfeasant, the system may determine one or more components that are affected by the application execution. The system generates a remediation action to fix any issues with the application execution. The remediation action may be automated or provided to an activity user (e.g., an application developer and/or network administrator) to be executed manually.

The system may use parallel processing in order to perform the operations discussed herein. As such, multiple different components of a network may perform the operations herein. Combining parallel processing with ML model(s) (e.g., a LSTM-based RNN framework) can facilitate the efficient routing of issues relating to application execution in batches and enable an efficient problem to fix similar problems. Parallel processing is beneficial in dealing with a large number of issues or problem reports. The system can divide the incoming issues into batches and process them concurrently using parallel processing techniques. Each batch can be assigned to a separate instance of the ML model(s), which can analyze the issues simultaneously. Parallel processing allows for efficient distribution of the workload across multiple processors or computing resources. The distributed nature of parallel processing significantly speeds up the analysis and routing process, as multiple issues can be processed concurrently, which enables a faster response time for routing and addressing the issues, leading to improved efficiency in handling a large volume of incoming problems.

The system also provides more efficient remediation action determination for similar issues. The ML model(s), being a neural network, has the ability to learn patterns and relationships from the data the ML model(s) have been trained on. By training the ML model(s) on historical problem data and associated solutions, the system can develop an understanding of the relationships between specific problems and their corresponding fixes. As such, in an instance in which a new problem arises, the ML model(s) may analyze characteristics of the problem and predict the most likely fix based on the patterns it has learned. By leveraging parallel processing, the system can quickly match the current problem with similar problems from the training data and identify the corresponding solutions. As such, the system allows for efficient problem fixing for similar problems as the system takes advantage of the neural network's ability to generalize from past experience. By parallelizing the analysis, the system can process multiple similar problems simultaneously, further enhancing the efficiency of the problem resolution process.

By combining parallel processing with ML model(s), the system can efficiently route issues in batches and provide effective fixes for similar problems. The parallel processing capabilities expedite the analysis and routing of a large number of issues, while the ML model(s) use learned patterns for efficient problem resolution based on past experiences.

In the context of root cause analysis, the system may leverage the insights gained from the combined parallel processing and ML model(s) to suggest remediation actions and/or auto provision resources. Once the system identifies the root causes of a problem or issue using the operations herein, the system can analyze the patterns and relationships learned by the ML model(s). The analysis provides valuable insights into the appropriate remediation steps or actions that need to be taken to address the identified root causes. Based on the analysis of root causes, the system may suggest specific remediation actions or steps to resolve the identified issues. These suggestions can be tailored to the specific nature of the problem and the available resources or tools in the system. For example, if the root cause analysis identifies a software bug as the cause of a system failure, the system may suggest applying a software patch or updating the software version to fix the issue. If the root cause analysis reveals a hardware malfunction, the system may suggest replacing the faulty hardware component.

In some cases, the system may go beyond just suggesting remediation steps and automate the provisioning of necessary resources to resolve the problem (e.g., via automatically causing execution of the remediation action). For example, if the root cause analysis determines that additional computing resources are required to handle a sudden increase in workload, the system may automatically provision additional servers or allocate more processing power to address the issue. By integrating the root cause analysis system with resource management or provisioning tools, the system may automate the process of provisioning the required resources. The automation of the remediation action allows for a quicker response to identified issues, reduces manual intervention, and enables more efficient resource allocation based on the analysis of root causes.

As such, the system can provide valuable insights into the root causes of problems. These insights can be utilized to suggest specific remediation actions or automate the provisioning of resources, streamlining the process of addressing issues and improving the efficiency of problem resolution.

The system uses the ML model(s), which is trained on historical data and associated root causes. The ML model(s) learn patterns and relationships within the data, allowing it to recognize similarities and correlations between input data and known root causes. Before inputting the data into the ML model(s), preprocessing techniques such as data cleaning, normalization, and feature extraction may be applied. These techniques help to enhance the quality and relevance of the data, making it easier for the model to identify relevant patterns.

The system may use parallel processing techniques to distribute the analysis workload across multiple processors. Each processor or computing resource can independently evaluate different aspects of the data using the connectionist model. The ML model(s) may assign probabilities or confidence scores to different potential root causes based on the patterns it has learned. The ML model(s) evaluate the input data and computes the likelihood of each potential root cause, allowing for probabilistic analysis.

The system compares the probabilities or confidence scores assigned to different potential root causes. The root cause with the highest probability or confidence score is identified as the most likely candidate. The system may also rank the potential root causes based on their probabilities or scores to provide a clearer understanding of the likelihood of each cause. In some cases, the initial identification of the root cause may not be completely accurate. The system may iterate and refine the analysis process by gathering additional data, reevaluating the patterns, and updating the connectionist model. This iterative refinement helps to improve the accuracy of root cause identification over time.

In various embodiments, the system may also be capable of remediation and prevention of anomalies. As such, the system may analyze identified anomalies and leverage the interpretability techniques of the ML model(s) (e.g., LSTM-based RNN framework(s)) to understand the contributing factors. Analysis of the identified anomalies may involve examining the learned representations, feature importance analysis, or attention mechanisms.

Based on the root cause analysis, the system may devise appropriate remediation strategies (e.g., determine remediation action(s)) to address the identified anomalies. Remediation strategies may include adjusting system configurations, reallocating resources, or applying specific fixes to the distributed compute application network.

The system may also continuously monitor the distributed compute application network using the ML model(s) (e.g., a LSTM-based RNN model). As such, the system may be capable of detecting anomalies in real-time and taking preventive actions before the anomalies escalate. Such proactive monitoring may include triggering alarms, sending notifications, or initiating automated remediation processes. As such, the system allows for real-time or near real-time anomaly detection and remediation.

FIGS. 1A-1C illustrate technical components of an example distributed computing environment for determining causes of network anomalies across a distributed network, in accordance with an embodiment of the disclosure. As shown in FIG. 1A, the distributed computing environment 100 contemplated herein may include a system 130 (e.g., a network monitoring device), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to the shared communication within the network, the distributed network often also supports distributed processing. The network 110 may be a form of digital communication network such as a telecommunication network, a local area network ("LAN"), a wide area network ("WAN"), a global area network ("GAN"), the Internet, a satellite network, a cellular network, and/or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an example component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 (shown as "LS Interface") connecting to the memory 104, and a low-speed interface 112 connecting to low-speed expansion port 114 (shown as "LS Port") and storage device 106. Each of the components 102, 104, 106, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-readable or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an example component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an example machine learning (ML) subsystem architecture 200, in accordance with various embodiments of the present disclosure. The machine learning subsystem 200 may include a data acquisition engine 202, data ingestion engine 210, data pre-processing engine 216, ML model tuning engine 222, and inference engine 236. The ML subsystem architecture 200 may be used to determine patterns of known performance indicators in error logs. The ML subsystem architecture 200 may be used to compare the known performance indicators and the performance indicators as discussed in reference to FIGS. 3A and 3B. In various embodiments, the ML subsystem architecture 200 may be used to carry out one or more operations discussed in reference to FIGS. 3A and 3B below.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

In various embodiments, the ML model(s) may include one or more connectionist models. Namely, the ML model(s) may include recurrent neural network(s) (RNNs) and/or Long Short-Term Memory network(s) (LSTMs). As such, the ML model(s) may include a LSTM based RNN model used in various operations discussed herein. The LSTM based RNN frameworks may be highly effective for pattern recognition on correlated anomalies. The ML model frameworks excel at capturing long-term dependencies in sequential data, making the ML model framework well-suited for tasks such as anomaly detection, time series forecasting, and natural language processing.

RNNs are a type of neural network architecture that allows information to persist across different time steps. RNNs operate on sequential data by maintaining hidden states, which are updated at each time step based on both the current input and the previous hidden state. LSTM-based RNN frameworks are used to address the vanishing gradient problem in RNNs. As such, the ML model(s) may include LSTM-based RNN frameworks that are RNNs that incorporate LSTM cells.

LSTM cells consists of multiple interconnected components that enable the LSTM cell to selectively retain and/or forget information over long sequences. Example components of an LSTM cell include cell state, input gate, forget gate, output gate, hidden state, and/or the like.

Cell state serves as a memory unit within the LSTM. The cell state can store and propagate information over long periods of time. The LSTM cell is capable of store and propagate information over long periods of time with various gates, such as the gates discussed herein, that regulate the flow of information into and out of the cell state.

In various embodiments, input gate(s) may be used to determine how much of the current input should be added to the cell state. The amount to be added to the cell state is computed based on the current input and the previous hidden state. The input gate value may range from 0 to 1, where 0 means no contribution from the input, and 1 means full contribution.

In various embodiments, forget gate(s) may be used to control how much of the previous cell state should be forgotten. The forget gate decides which information from the previous cell state should be discarded. The forget gate value may range from 0 to 1, where 0 means forget completely, and 1 means retain entirely.

In various embodiments, output gate(s) may be used to determine how much of the cell state should be exposed to the next hidden state. The output gate regulates the amount of information to be outputted based on the current input and the previous hidden state.

In various embodiments, the hidden state is an output of the LSTM cell. The hidden state carries information to the next time step and potentially to other layers of the LSTM-based RNN framework. The hidden state may be computed by selectively exposing the cell state to the output gate.

In various embodiments, the connectionist model(s) leverage the power of sequence modeling for anomaly detection, remediation, and prevention in accordance with the operations discussed herein.

Example components of connectionist model(s) may include input representation, LSTM layers, output layers, training and validation components, and/or the like. Example input representation includes the preprocessed logs (e.g., error logs discussed in reference to FIGS. 3A and 3B) as sequential input data with each sequence consisting of the extracted features (e.g., known performance indicators). For example, each sequence can be represented as a time-ordered sequence of error codes and timestamps.

Example LSTM layers include stacked layers capable of capturing temporal dependencies and learn the patterns in error log sequences. The LSTM layers may enable the model to understand the sequence of events leading up to the failure and identify anomalies during operation.

Example output layer(s) may be designed for various tasks, such as anomaly detection, root cause analysis, and/or the like. As such, the output layer(s) may be used to detect anomalies and determine root causes for said anomalies. The anomaly detection may include generating a binary classification output that predicts whether an error log sequence is normal or anomalous. As such, the anomaly detection can be used to designate an operating status for a previous application execution, as well as being used in the operations of FIGS. 3A and 3B. The root cause analysis may include formulating a multi-class classification output that predicts the specific root cause category associated with a given anomaly. The root cause analysis may be used in various embodiments discussed herein to determine a remediation action.

Example training and validation components allow the ML model(s) to split the preprocessed error log data to be used as training and validation data sets. As such, the training and validation data sets may be used to train the ML model(s), allowing for optimization of the ML model(s) via backpropagation and gradient descent. The validation performance may be monitored, via manual and/or automated review, to determine model performance.

In various embodiments, LSTM-based RNN frameworks may be trained using backpropagation through time (BPTT), which extends the standard backpropagation algorithm for feedforward neural networks to recurrent architectures. The optimization of the LSTM-based RNN framework involves updating the parameters (weights and biases) to minimize a specified loss function, such as mean squared error or cross-entropy.

In the context of pattern recognition on correlated anomalies, LSTM-based RNN frameworks excel at capturing complex temporal relationships and identifying abnormal patterns in the data. The ability of LSTM cells to retain and propagate information over long sequences, combined with the depth of the network and the bi-directional processing, enables the framework to effectively detect and recognize correlated anomalies in sequential data.

In various embodiments, the ML model(s) may include multiple LSTM Layers. For example, the LSTM-based RNN frameworks may consist of multiple LSTM layers stacked on top of each other. Each LSTM layer takes the output of the previous layer or the input sequence and processes the value using LSTM cells. Stacking multiple LSTM layers allows the framework to learn increasingly complex representations and capture higher-level dependencies.

In various embodiments, the ML model(s) may be bi-directional. For example, the LSTM-based RNN frameworks may be bi-directional. In some cases, using a single-directional LSTM may not be capable of capturing all patterns in sequential data. Bi-directional LSTMs processes the input sequence in both forward and backward directions. Bi-directional processing allows the LSTM-based RNN framework to leverage information from past and future time steps simultaneously.

In various embodiments, support vector(s) may be used in connection with the ML model(s). For example, support vector(s) may be used to supplement the LSTM-based RNN frameworks to enhance the fault tolerance system. Support vectors can be derived from historical failure data, expert knowledge, external resources, and/or the like. The support vector(s) provide additional contextual information and can be used as input features to the LSTM-based RNN model for improved anomaly detection and root cause analysis.

In various embodiments, the ML model(s) may be used in operations of FIGS. 3A and 3B discussed below. For example, a LSTM-based RNN framework can be used for anomaly detection. Anomaly detection may be completed based on event types and event scoring. Anomaly detection involves identifying unusual or rare events that deviate from the normal behavior of a system. The framework can learn patterns in the sequential data comprising event types and their corresponding event scores.

Event types represent the categorical labels or classes assigned to different events in the sequential data. For example, in a cybersecurity context, event types could correspond to various types of network activities or system events. These event types provide contextual information and help define the normal behavior of the system. In various embodiments, the ML model(s) may also use event type embeddings to enhance the representation of event types. Event type embeddings are low-dimensional vector representations that capture semantic relationships between different event types. Event type embeddings may be learned jointly with the rest of the model during the training phase or pre-trained using techniques such as Word2Vec or GloVe.

Event scoring assigns a numerical value or score to each event, representing its relevance or abnormality. The event scores can be based on various factors, such as the severity of the event, the deviation from expected behavior, or a combination of multiple metrics. High event scores indicate a higher likelihood of an anomaly.

In various embodiments, the sequential data comprising event types and event scores is prepared for input to the LSTM-based RNN framework. The data is typically encoded as a sequence of vectors, where each vector represents an event with the corresponding event type and event score. As such, sequential representation preserves the temporal order of events, allowing the LSTM-based RNN to capture temporal dependencies effectively.

During the training phase, the LSTM-based RNN framework learns to model the regular behavior of the system based on the provided labeled data (e.g., the previous application executions that are designated as regular or malfeasant operating status). The framework takes the sequential input data and processes it through the LSTM layers. The LSTM cells capture the temporal dependencies and learn to recognize patterns specific to the event types and associated event scores.

ML model(s) (e.g., LSTM-based RNN framework(s)) that are trained on the regular behavior of the system can be used for anomaly detection. During the detection phase, the ML model(s) may receive a new sequence of event types and event scores as input. The LSTM layers process the input sequence, and the final hidden state or output of the framework represents the encoded representation of the entire sequence.

After encoding the input sequence, the LSTM-based RNN framework may reconstruct the sequence or predict the event scores for each event type. By comparing the reconstructed sequence or predicted event scores with the actual input sequence, the framework can quantify the deviation or reconstruction error. Higher reconstruction errors indicate anomalies or events that significantly differ from the learned patterns.

Anomaly detection can be performed by setting a threshold on the reconstruction error or the deviation between predicted and actual event scores. Events with reconstruction errors above the threshold or significant deviations from expected event scores are flagged as anomalies. The threshold can be determined using statistical methods, domain knowledge, or through the evaluation of a validation set.

By leveraging the event types and event scoring, the LSTM-based RNN framework may effectively capture the sequential dependencies and identify anomalies that deviate from the normal behavior of the system. The framework has the ability to learn complex patterns and understand the contextual information provided by event types and event scores allowing for improved anomaly detection. As such, the system allows for root cause analysis to be improved by grouping similar causes and creating predictive models for future reference.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The ML model(s) may be continuously refined during operation. For example, the LSTM-based RNN model may be fine-tuned by collecting more error logs, as well as updating any error extraction templates. Additional refining may be achieved by incorporating feedback from experts and/or monitoring the system's performance to improve accuracy and responsiveness.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the system 130. In still other cases, machine learning models that perform regression techniques may use live data 234 to predict or forecast continuous outcomes.

It will be understood that the embodiment of the machine learning subsystem 200 illustrated in FIG. 2 is an example ML subsystem and that other embodiments may vary. As another example, in some embodiments, the machine learning subsystem 200 may include more, fewer, or different components.

FIGS. 3A and 3B illustrate a process flow for determining causes of network anomalies across a distributed network, in accordance with various embodiments of the present disclosure. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. Additionally, ML/AI may also be used, such the AI/ML discussed in reference to FIG. 2. For example, the system may use a LSTM-based RNN framework to detect anomalies and determine remediation actions.

Referring now to optional Block 302 of FIG. 3A, the method includes identifying one or more performance indicators to monitor during the operations of the application on the network. The performance indicators may be any metric relating to the network during execution of the application. As such, the performance indicator may include component level metrics for one or more components used during the application. Example components include various components shown in FIGS. 1A-1C, such as processors, memory devices, communication interfaces, and/or the like. The performance indicators may be a custom metric or a predefined metric (e.g., a metric already monitored for other purposes). As such, the system may receive a custom metric input from an end-point device associated with the application (e.g., a developer of the application may select custom metrics to monitor).

Examples of performance indicators includes number of requests on a server (e.g., requests per second), availability or how long a server has been operating (e.g., uptime), percentage of requests which fail or don't receive a response (e.g., error rates), total number of requests being received at a particular time (e.g., thread count), average for each cycle including a request and a response over a period of time (e.g., average response time (ART)), longest cycle including a request and a response over a period of time (e.g., peak response time (PRT)), and/or the like.

Referring now to Block 304 of FIG. 3A, the method includes determining one or more known indicator patterns from one or more error logs for one or more applications on a network. A known indicator pattern includes one or more performance indicators from previous application execution. A performance indicator from previous application execution may also be known as a known performance indicator. The known indicator pattern may include time-based performance indicators (e.g., performance indicators at multiple times along an application execution). As such, the known indicator pattern may include performance indictors for multiple periods of time across the execution of a given application.

In various embodiments, a known indicator pattern includes known performance indicators obtained via one or more error logs. The error logs may include various performance indicators relating to an application execution. In such an instance, the error log also indicates the operating designation of the given application execution. For example, the error log may include information relating to application executions with an indication of a malfeasant operating status or a regular operating status. For example, the error log may include information relating to application executions that have been investigated, either via the operations herein or other methods, to determine whether the application execution was malfeasant or regular. A malfeasant operating status is any application execution that provides an unexpected strain on the network (e.g., an application execution that results in component strain that was not accounted for by the system). Such an unexpected strain may be based on previous application execution (e.g., via the operations herein) and/or via expected values. Additionally, a malfeasant status may be designated in an instance the application execution causes a usage greater than a maximum value for one or more network components (e.g., a processor may have an upper heat limit and the status may be malfeasant in an instance in which the processor is above said heat limit).

The error logs may include comprehensive logs from the distributed computer application network capturing system events, error messages, timestamps, and/or other relevant information. The error logs serve as a crucial data source for identifying anomalies and analyzing root causes. In various embodiments, the system may receive more than just the known performance indicator(s). For example, the system may receive error logs with various information relating to application execution. As such, the system may preprocess error logs to determine the known indicator pattern(s). The error logs may be preprocessed by cleaning the data, handling missing values, converting data into a suitable format for analysis, and/or the like. Additionally, the system may apply the error extraction template to extract relevant features from the error logs, such as error codes, error types, timestamps, error descriptions, and/or the like.

In various embodiments, the known indicator patterns may be formatted as an error extraction template. The error extraction template may define the structure of error messages, including common patterns, keywords, and/or relevant information. The error extraction template helps in extracting meaningful features from the application failure logs and improves the accuracy of anomaly detection.

In various embodiments, the one or more applications may include the application being analyzed in the operation herein (e.g., the performance indicators for the application of Block 306 are compared to known indicator patterns from the same application at a different time). Additionally or alternatively, the one or more applications may be other applications on the network (e.g., applications on a network may have similar errors and as such may be used to determine errors with applications being executed).

In various embodiments, the system may be configured to train and/or update a machine learning model and/or an AI model used to determine one or more known indicator patterns from one or more error logs for one or more applications on a network. Such ML/AI model(s) may also be used to compare the known indicator patterns and the performance indicators as discussed herein.

Referring now to Block 306 of FIG. 3A, the method includes receiving one or more performance indicators during an execution of an application on the network. The performance indicators may be any metric relating to the network during execution of the application. As such, the performance indicator may include component level metrics for one or more components used during the application. Example components include processors, memory devices, communication interfaces, and/or the like. The performance indicators may be a custom metric or a predefined metric (e.g., a metric already monitored for other purposes). As such, the system may receive a custom metric input from an end-point device associated with the application (e.g., a developer of the application may select custom metrics to monitor). In various embodiments, the performance indicator(s) may be received in the form of an error log that includes information relating to system events, error messages, timestamps, and/or other relevant information.

Examples of performance indicators includes number of requests on a server (e.g., requests per second), availability or how long a server has been operating (e.g., uptime), percentage of requests which fail or don't receive a response (e.g., error rates), total number of requests being received at a particular time (e.g., thread count), average for each cycle including a request and a response over a period of time (e.g., average response time (ART)), longest cycle including a request and a response over a period of time (e.g., peak response time (PRT)), and/or the like. Various other performance indicators may be monitored, such as component status and metrics, network performance, and/or the like.

Referring now to Block 308 of FIG. 3A, the method includes comparing the one or more performance indicators to one or more known indicator patterns. As discussed above, the known indicator pattern(s) may include one or more known performance indicators. The performance indicator(s) may be compared to known performance indicator(s) of the same kind. For example, the number of requests on a server during the current application execution may be compared to number of requests on a server during the previous application execution.

In various embodiments, the comparison of the one or more performance indicators to one or more known indicator patterns may be time based. For example, each of the performance indicator(s) and the known indicator pattern(s) may have time stamps and/or other time indicators that are used to determine similar performance indicators and known performance indicators. For example, the time in which an application execution is started may be monitored, such that a performance indicator can be compared between the current application execution and previous application execution at the same or similar time along the application execution. Additionally, the change between different performance indicators from a first time to a second time may indicate an issue. For example, a known performance indicator may remain relatively constant from a first time to a second time during the operation of previous application and the comparison of the performance indicator to one or more known indicator pattern may include the change of the between the first time and the second time (e.g., an application that is malfeasant may be matching a known indicator pattern that corresponds to a malfeasant designation).

In various embodiments, the determination of whether the application execution is malfeasant may be based on the type of designation of the known indicator pattern compared. For example, a known indicator pattern that is designated as regular operating status may indicate that the application is executing regularly in an instance in which the performance indicator(s) and the known performance indicator(s) are the same or similar, and the application is executing in a malfeasant manner in an instance in which the performance indicator(s) and the known performance indicator(s) are not the same or similar. Alternatively, in an example in which a known indicator pattern that is designated as malfeasant operating status may indicate that the application is executing in a malfeasant manner in an instance in which the performance indicator(s) and the known performance indicator(s) are the same or similar, and the application is executing in a non-malfeasant (e.g., regular) manner in an instance in which the performance indicator(s) and the known performance indicator(s) are not the same or similar.

In various embodiments, the performance indicator(s) may be formatted as an error extraction template in order to be directly compared to the known indicator pattern(s). In various embodiments, the system may receive more than just the performance indicator(s). For example, the system may receive error logs with various information relating to application execution. As such, the system may preprocess error logs to determine the performance indicator(s). The error logs may be preprocessed by cleaning the data, handling missing values, converting data into a suitable format for analysis, and/or the like. Additionally, the system may apply the error extraction template to extract relevant features from the error logs, such as error codes, error types, timestamps, error descriptions, and/or the like.

Referring now to Block 310 of FIG. 3A, the method includes determining at least one of the one or more performance indicators that is malfeasant based on the comparison of the one or more performance indicators to one or more known indicator patterns. A performance indicator may be malfeasant in an instance in which the given performance indicator is the same or similar (e.g., within a predetermined range) than a known performance indicator of a known performance pattern that is designated as malfeasant operating status, or in an instance in which the given performance indicator is different than a known performance indicator of a known performance pattern that is designated as regular operating status.

Referring now to Block 312 of FIG. 3A, the method includes determining a malfeasant component of the network based on the one or more performance indicators that is malfeasant. The malfeasant component may be based on the malfeasant performance indicator. For example, the system may associate each performance indicator with one or more components of the network that are most responsible for changes to the performance indicator.

The malfeasant component may be any component that is affected in an unexpected way by the execution of the application. An unexpected affect may include extreme strain and/or other negative effects to the component. The malfeasant component need not actually be the issue with the application execution. For example, the malfeasant component may be a processing device in an instance in which the application causes more than expected processing strain. As such, the component need not necessarily be the cause of the malfeasant operating status.

Referring now to Block 314 of FIG. 3A, the method includes determining a remediation action to be executed in response to the comparison of the one or more performance indicators to one or more known indicator patterns. The remediation action is based on the malfeasant component of the application. The remediation action may be any action that fixes the issue of the application execution. The remediation action may include changing component configuration (e.g., a processor intensive application may need more dedicated processing power), application modification (e.g., changes to the application code to allow to remove strain on a malfeasant component), and/or the like.

In various embodiments, the remediation action may include a recommendation for improving the application execution of the application. In various embodiments, the system may determine the one or more ways in which a user can be remedied based on the malfeasant component(s). For example, the system may include potential solutions to fix the malfeasant component(s).

In various embodiments, the generation of the remediation action may be wholly automated, partially automated (e.g., the remediation action may be recommended by the system and approved, changed, or rejected by an activity user), or manual (e.g., an activity user may make a determination of the remediation action). For example, an activity user may input a remediation action to be carried out by the system The system may then cause execution of the remediation action.

Referring now to optional Block 316 of FIG. 3B, the method includes causing a rendering of the remediation action on a graphical user interface of an end-point device associated with the application. The remediation action may be caused to be transmitted to one or more activity users of the network (e.g., the end-point device associated with the application may be an end-point device of an activity user). The activity user may be any user associated with the application and/or network. In various embodiments, an activity user may be a user on a network that is capable of making decisions relating to the remediation action. For example, the activity user may be an application developer and/or a network administrator. The activity user may be able to approve, modify, or reject a remediation action. In some instances, the activity user may actually cause the remediation action to be carried out (e.g., an activity user may cause a malfeasant component to be replaced by another non-malfeasant component). As such, in some instances, the remediation action may be carried out manually.

The system may cause the rendering of the remediation action to the activity user via a graphical user interface of the end-point device 140 (e.g., display interface 166). The rendering of the remediation action may include the remediation action and one or more additional prompts for the activity user to engage. For example, the activity user may approve, modify, or reject the remediation action via engagement with the rendering.

Referring now to optional Block 318 of FIG. 3B, the method includes receiving an action input from the end-point device in response to the rendering of the remediation action on a graphical user interface. The action input may be any input from the end-point device associated with the application after the remediation action is rendered to the end-point device. For example, the action input may be an approval, modification, and/or rejection of the remediation action. The action input may also include additional information relating to the application (e.g., to be used to update the remediation action). Example information may include component information based on manual investigation by the activity user (e.g., the activity user may perform a test on a potentially malfeasant component.

Referring now to optional Block 320 of FIG. 3B, the method includes updating the remediation action based on the action input. In various embodiments, the action input may include a remediation action to replace the remediation action (e.g., an activity user may provide a remediation action to be executed instead of the originally determined remediation action). In various embodiments, the action input may be a modification to the remediation action (e.g., the activity user may modify the remediation action).

In various embodiments, the system may update the remediation action based on information included in the action input. For example, the activity user may provide information relating to one or more components that cause the recommended remediation action to be different. As such, the system may determine an updated remediation action based on the action input. In various embodiments, the updated remediation action may be treated as the remediation action in the operations herein (e.g., the updated remediation action may be caused to be transmitted to the end-point device and/or the system may cause execution of the updated remediation action).

Referring now to optional Block 322 of FIG. 3B, the method includes causing an execution of the remediation action. In various embodiments, the remediation action may be automated. In various embodiments, the execution of the remediation action may be wholly automated, partially automated (e.g., the system may carry out some portion of the remediation action and an activity user may carry out another portion of the remediation action), or manual (e.g., an activity user may carry out the remediation action after it is provided via the rendering).

Referring now to optional Block 324 of FIG. 3B, the method includes receiving one or more updated performance indicators after an execution of the remediation action. In various embodiments, the performance indicators may be monitored after execution of the remediation action. For example, the application may be executed again after the execution of the remediation action. As such, the updated performance indicators may be used as the performance indicators discussed herein. In such an instance, the updated performance indicators may be compared to the original performance indicators (e.g., to determine whether the remediation action caused any change to the performance indicators). In an example embodiment, in an instance in which the updated performance indicators are the same or similar as the performance indicators from before the execution of the remediation action, the system may determine the remediation action was unsuccessful. The updated performance indicator(s) may also be processed via the operations discussed herein in the place of the performance indicator(s). For example, the updated performance indicator(s) are compared to the known indicator pattern(s) to determine whether the application execution is regular operating status. Such operations may be used to determine the result of the remediation action, as discussed below in reference to Block 326.

Referring now to optional Block 326 of FIG. 3B, the method includes determining a result of the remediation action based on the one or more updated performance indicators. The result of the remediation action may include information on the success of the remediation action on fixing any issues with the application. Examples results of the remediation action may include that the remediation was successful, not successful, partially successful, and/or the like.

In an example in which the remediation action was successful, the system may return to normal operations (e.g., monitoring performance indicator(s) for changes either continuously or periodically) and no additional remediation action may be taken. Normal operations may be an instance in which the updated performance indicators are the same or similar to known performance patterns that correspond to a regular operating status (e.g., any performance indicators that were out of line with typical operations may be returned to typical operation values). As such, the application may be executed on the network without any additional changes to the network.

In an example in which the remediation action was not successful, the system may determine one or more additional remediation actions to perform in order to correct any issues with the application. For example, a specific type of pattern may have multiple potential causes and the remediation action may be the most common cause, and in an instance in which the remediation action does not fix the issue, the system may determine additional remediation actions based on other common causes of said issue.

In an example in which the remediation action was partially successful, the system may determine whether one or more additional remediation actions should be performed in order to correct any issues with the application. A remediation action may be partially successful in an instance in which the updated performance indicators are the closer, but not the same as known performance patterns that correspond to a regular operating status (e.g., a performance indicator may be improved, but not in line with typical operations).

Referring now to optional Block 328 of FIG. 3B, the method includes training and/or updating a machine learning model and/or an AI model used to determine the known indicator patterns from error logs. The machine learning model and/or an AI model may also be used to compare the performance indicators with the known indicator patterns. As discussed above in reference to FIG. 2, the ML model may include a LSTM-based RNN framework. As such, the ML model(s) may be trained and/or updated as discussed in reference to FIG. 2.

In various embodiments, the method includes training a machine learning model and/or an AI model to determine the one or more known performance indicators from the error logs associated with a previous application execution. For example, previous error logs with operating status designations may be used as a training set to teach the ML/AI model(s). The patterns of the one or more known performance indicators may be the same across multiple application execution and as such, the ML/AI model(s) may use the pattern to detect the known indicator patterns.

In various embodiments, the method includes updating a machine learning model and/or an AI model to determine the one or more known performance indicators from the error logs associated with a previous application execution. For example, newly received error logs with operating status designations may be used as an updated training set to teach the ML/AI model(s). The patterns of the one or more known performance indicators may be the same across multiple application execution and as such, the ML/AI model(s) may use the pattern to detect the known indicator patterns. Additionally, the performance indicators determined herein may also be used for future operations (e.g., the ML/AI model(s) may be trained and/or updated to use the performance indicators as known performance indicators in future operations). As such, determinations discussed herein may be used to train and/or update the ML/AI models used herein.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining causes of network anomalies across a distributed network, the system comprising:
   at least one non-transitory storage device containing instructions; and
   at least one processing device coupled to the at least one non-transitory storage device, wherein the at least one processing device, upon execution of the instructions, is configured to:
   determine one or more known indicator patterns from one or more error logs for one or more applications on a network, wherein each of the one or more known indicator patterns comprises known performance indicators from one or more error logs;
   receive one or more performance indicators during an execution of an application on the network;
   compare the one or more performance indicators to the one or more known indicator patterns, wherein each of the one or more known indicator patterns has an operating designation, wherein the operating designation comprises an indication of a malfeasant operating status or a regular operating status;
determine at least one of the one or more performance indicators that is malfeasant based on the comparison of the one or more performance indicators to one or more known indicator patterns;
determine a malfeasant component of the network based on the one or more performance indicators that is malfeasant, wherein the malfeasant component of the network is associated with one of the at least one of the one or more performance indicators that is malfeasant;
determine a remediation action to be executed in response to the comparison of the one or more performance indicators to one or more known indicator patterns, wherein the remediation action is based on the malfeasant component of the application; and
cause a rendering of the remediation action on a graphical user interface of an end-point device associated with the application.

2. The system of claim 1, wherein the at least one processing device, upon execution of the instructions, is configured to identify one or more performance indicators to monitor during operations of the application on the network.

3. The system of claim 1, wherein the at least one processing device, upon execution of the instructions, is configured to cause an execution of the remediation action.

4. The system of claim 1, wherein the at least one processing device, upon execution of the instructions, is configured to receive an action input from the end-point device in response to the rendering of the remediation action on a graphical user interface.

5. The system of claim 4, wherein the at least one processing device, upon execution of the instructions, is configured to update the remediation action based on the action input.

6. The system of claim 1, wherein the at least one processing device, upon execution of the instructions, is configured to:
receive one or more updated performance indicators after an execution of the remediation action.

7. The system of claim 6, wherein the at least one processing device, upon execution of the instructions, is configured to determine a result of the remediation action based on the one or more updated performance indicators.

8. A computer program product for determining causes of network anomalies across a distributed network, the computer program product comprising at least one non-transitory computer-readable medium having computer-readable program code portions embodied therein, the computer-readable program code portions comprising one or more executable portions configured to:
determine one or more known indicator patterns from one or more error logs for one or more applications on a network, wherein each of the one or more known indicator patterns comprises known performance indicators from one or more error logs;
receive one or more performance indicators during an execution of an application on the network;
compare the one or more performance indicators to the one or more known indicator patterns, wherein each of the one or more known indicator patterns has an operating designation, wherein the operating designation comprises an indication of a malfeasant operating status or a regular operating status;
determine at least one of the one or more performance indicators that is malfeasant based on the comparison of the one or more performance indicators to one or more known indicator patterns;
determine a malfeasant component of the network based on the one or more performance indicators that is malfeasant, wherein the malfeasant component of the network is associated with one of the at least one of the one or more performance indicators that is malfeasant;
determine a remediation action to be executed in response to the comparison of the one or more performance indicators to one or more known indicator patterns, wherein the remediation action is based on the malfeasant component of the application; and
cause a rendering of the remediation action on a graphical user interface of an end-point device associated with the application.

9. The computer program product of claim 8, wherein the computer-readable program code portions comprising one or more executable portions are also configured to identify one or more performance indicators to monitor during operations of the application on the network.

10. The computer program product of claim 8, wherein the computer-readable program code portions comprising one or more executable portions are also configured to cause an execution of the remediation action.

11. The computer program product of claim 8, wherein the computer-readable program code portions comprising one or more executable portions are also configured to receive an action input from the end-point device in response to the rendering of the remediation action on a graphical user interface.

12. The computer program product of claim 11, wherein the computer-readable program code portions comprising one or more executable portions are also configured to update the remediation action based on the action input.

13. The computer program product of claim 8, wherein the computer-readable program code portions comprising one or more executable portions are also configured to:
receive one or more updated performance indicators after an execution of the remediation action.

14. The computer program product of claim 13, wherein the computer-readable program code portions comprising one or more executable portions are also configured to determine a result of the remediation action based on the one or more updated performance indicators.

15. A method for determining causes of network anomalies across a distributed network, the method comprising:
determining one or more known indicator patterns from one or more error logs for one or more applications on a network, wherein each of the one or more known indicator patterns comprises known performance indicators from one or more error logs;
receiving one or more performance indicators during an execution of an application on the network;
comparing the one or more performance indicators to the one or more known indicator patterns, wherein each of the one or more known indicator patterns has an operating designation, wherein the operating designation comprises an indication of a malfeasant operating status or a regular operating status;
determining at least one of the one or more performance indicators that is malfeasant based on the comparison of the one or more performance indicators to one or more known indicator patterns;
determining a malfeasant component of the network based on the one or more performance indicators that is malfeasant, wherein the malfeasant component of the network is associated with one of the at least one of the one or more performance indicators that is malfeasant;

determining a remediation action to be executed in response to the comparison of the one or more performance indicators to one or more known indicator patterns, wherein the remediation action is based on the malfeasant component of the application; and causing a rendering of the remediation action on a graphical user interface of an end-point device associated with the application.

16. The method of claim 15, further comprising identifying one or more performance indicators to monitor during operations of the application on the network.

17. The method of claim 15, further comprising causing an execution of the remediation action.

18. The method of claim 15, further comprising receiving an action input from the end-point device in response to the rendering of the remediation action on a graphical user interface.

19. The method of claim 18, further comprising updating the remediation action based on the action input.

20. The method of claim 15, further comprising:

receiving one or more updated performance indicators after an execution of the remediation action; and determining a result of the remediation action based on the one or more updated performance indicators.

\* \* \* \* \*